Sept. 26, 1967 F. HILDEBRANDT 3,343,874
SAFETY DEVICE
Filed May 2, 1966 2 Sheets-Sheet 1

INVENTOR:
FRIEDRICH HILDEBRANDT
BY
ATT'YS

Sept. 26, 1967  F. HILDEBRANDT  3,343,874

SAFETY DEVICE

Filed May 2, 1966  2 Sheets-Sheet 2

INVENTOR:
FRIEDRICH HILDEBRANDT
BY
Margall Johnston Cook
& Root ATT'YS

United States Patent Office 3,343,874
Patented Sept. 26, 1967

3,343,874
SAFETY DEVICE
Friedrich Hildebrandt, Wuppertal-Elberfeld, Germany, assignor to Glanzstoff AG, Wuppertal-Elberfeld, Germany
Filed May 2, 1966, Ser. No. 562,409
Claims priority, application Germany, Nov. 16, 1962, V 23,288
2 Claims. (Cl. 297—386)

ABSTRACT OF THE DISCLOSURE

A safety device for use in automobiles, airplanes, and parachutes in which the shocklike forward movement of an occupant is progressively braked by mechanical or hydraulic means. The braking means is so designed that recoil of the occupant is also controlled.

---

The present invention is a continuation-in-part of copending application Ser. No. 323,431, which was filed on Nov. 13, 1963, now abandoned. The invention is directed to a safety device which can be used by occupants of automobiles and airplanes as well as by parachute jumpers.

In automobiles and airplanes safety belts are used which serve to absorb the shocklike forward movement of the occupants such as occurs in an automobile collision or in a crash landing of an airplane. The belts damp the shock in such a way that the occupants are not thrown back into the seat and, therefore, are not physically harmed. In the process, the kinetic energy liberated is nullified in part by a lasting deformation of the textile belt material.

In order to fulfill the above purpose the safety belts must meet certain conditions. One such condition is as follows:

"At a test load of 1200 kg. the total stretch of the part pieces shall amount to at least 25% and at most 40%; the remaining stretch shall attain two-thirds of the total stretch."

The lower limit value of the total stretch of 25% must be reached in order that enough kinetic energy is nullified in the case of a sudden braking process so that the belt can at all times exercise its function as a safety device. The upper limit of the total stretch of 40% is fixed in order to prevent the belt, after a sudden braking of a vehicle, from lengthening too severely and thereby becoming ineffective because it no longer provides the person to be protected with a support. In this case the occupant may be thrown out of his seat against the part of the vehicle situated in front of him.

As experience has shown, it is difficult to produce a safety belt which fulfills these conditions with textile materials. For this reason safety belts are now in use which do not meet these requirements to the fullest extent.

The principal problem encountered in producing usable safety belts lies in the formation of definite stretch relationships such as the ratio of total stretch to the remaining stretch. This ratio is largely determined by the nature and the properties of the textile materials and also by the belt design. For this reason the stretch relationship is subject to certain fluctuations. A further drawback of the known safety belts lies in the fact that their stretch behavior cannot be adapted to the body weight of the wearer and has to be set for the average weight of an adult. Such a belt can hardly, for example, be effective in the case of a child. There is an additional point that the stretch behavior of the known safety belts is adjusted for maximum strain, that is, for a catastrophic occurrence. The preferably irreversible stretch cannot be utilized, therefore, for the balancing of small and medium brake shocks to which the occupants of motor vehicles are occasionally exposed. Furthermore, if the belt is once fully strained in a severe braking shock, it cannot be further used as a safety device.

It is an object of the present invention to provide a safety device which overcomes the problems set out above.

Other objects will become apparent to those skilled in the art from the following detailed description of the invention.

It has now been found that the kinetic energy liberated in the striking of a motor vehicle against an obstacle or in the landing of an airplane, insofar as it acts on the occupants of the vehicle, can be transformed in an effective manner and a manner harmless for the passengers by means of a particular braking device. The action of the braking device is transferred through suitable belts or harnesses to the person to be protected. The braking device can operate according to known principles and particularly in such a way that the holding belt is subjected to as low a tensile load as possible so that the elastic stretch of the belt is kept to a minimum.

The invention can best be understood by reference to the attached drawing in which.

Figure 1:
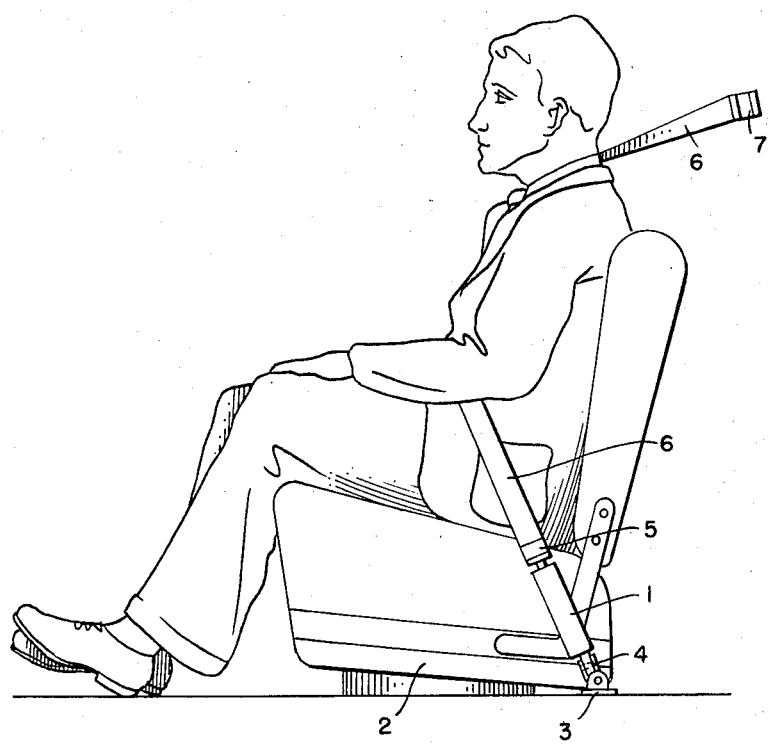
FIG. 1 is a side elevational view showing the braking device and its use in conjunction with a vehicle passenger.

In FIG. 1 a safety device of the present invention is shown mounted, for example, in an automobile. The fastening of the safety device can be accomplished in the same manner as with known safety belts. It is especially expedient to place the braking device between or beneath the seats and to anchor it to the floor of the vehicle. The attachment must be made in such a manner that the braking device can at all times be adjusted so that the forces working on the outside act in a line. This can be accomplished in a known manner, for example, through the use of a built-in universal joint. The braking device 1 of FIG. 1 is held beside the seat 2 by means of attachment 3 on the floor and is freely movable through universal joint 4. By means of fastening 5 the device is detachably coupled with a shoulder belt 6 which is attached at its other end to side wall 7 or to the floor of the vehicle. Braking device 1 can be coupled with all of the known types of belts and holding harnesses. Especially advantageous is the combination of the braking device with a shoulder belt. All of the high-strength belts of natural or synthetic material with a low stretch are suitable for use in conjunction with the braking device.

Through the use of the braking device a belt which does not have the stretch values established in the "Standards for the Testing of Safety Belts in Motor Vehicles" and which is coupled according to the invention with a braking device provides a safety means which functions perfectly in every case for occupants in automobiles and airplanes. If, for example, the safety belt is attached to a double-action pneumatic brake cylinder which is anchored in the floor beside the seat and is freely movable over a universal joint, this brake takes up the force of the impact of a human body in a collision and allows the body to slide back slowly into the seat. A mechanical-pneumatic brake cylinder operates in such a manner that a spring situated in a casing takes up and stores the energy acting on the person to be protected during the braking by way of a piston and piston rod. In the movement of the piston, air is drawn in through a check valve, which on relaxation of the spring escapes slowly through a second valve and thus prevents an abrupt liberation of the spring energy. Instead of a pneumatic braking device, other brake designs, of course, are usable for the subject purpose, especially hydraulically acting shock absorbers and those which operate only with spring force or electrically.

Figure 2:
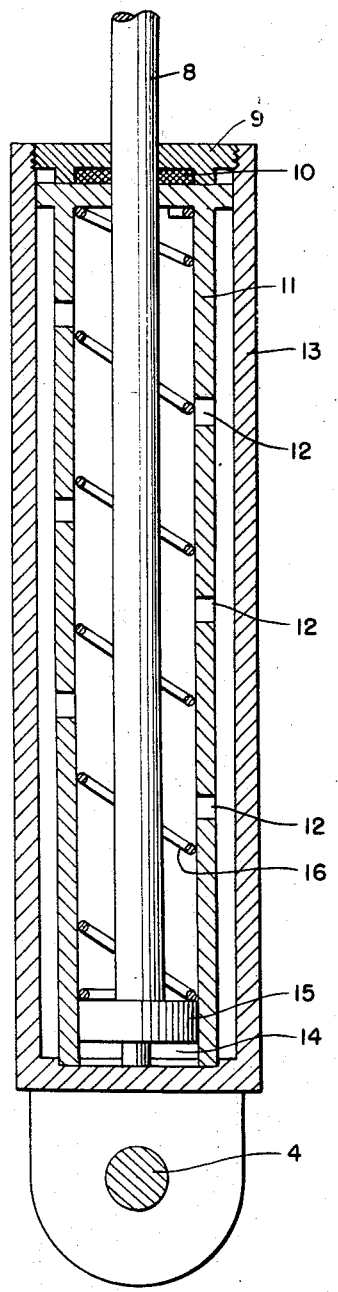
FIG. 2 is a diametric cross-sectional view of a hydraulic braking device of the subject invention.

In FIG. 2 a hydraulic braking device is illustrated. This double-acting hydraulic shock absorber can be coupled with a supporting belt or harness. The braking device is anchored to a hinge in the floor with universal joint or bolt 4. A supporting belt with which the person to be protected is buckled is attached to piston rod 8. The braking device is completely filled with a brake fluid to below screw cover 9 which is sealed with packing or seal 10. If a pull is exerted on piston rod 8, the piston surface presses on the fluid above it in the inner cylinder 11 and presses this through the escape openings 12 into the space between inner cylinder 11 and outer cylinder 13. From there the brake fluid passes through inlet slits 14 under piston 15. In the course of the upper movement of piston 15 little by little the outlet openings 12 for the brake fluid under pressure in the inner cylinder 11 drop out. Thereby, the efflux speed into the still active outlet openings 12 becomes greater and, likewise, the liquid friction. There occurs, therefore, an increasing damping of the piston movement. The spring 16 has only the function of pressing the piston 15 after the upward movement slowly back to its starting position.

A change in the number of outlet openings 12 and also their diameter and the selection of brake fluids of varying viscosity makes it possible to compensate for great kinetic energies in the braking device with limited stretch.

Figure 3:
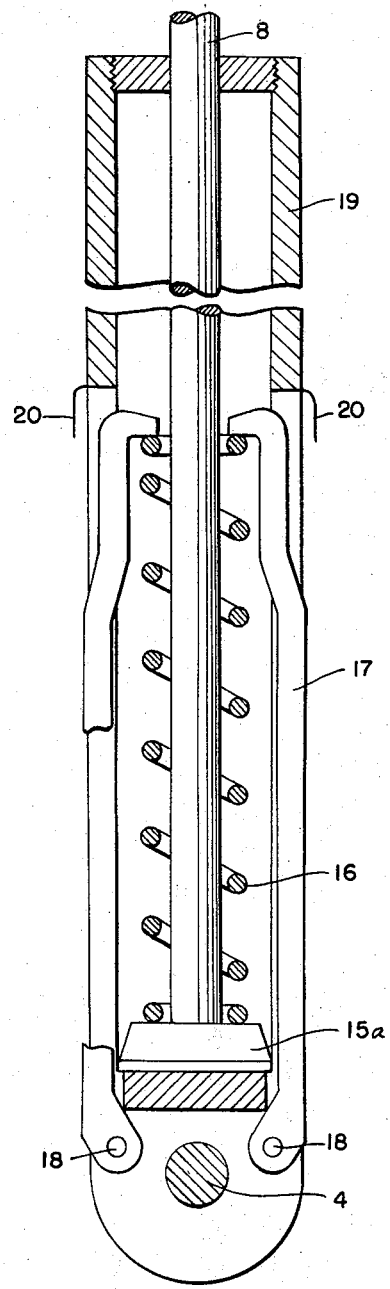
FIG. 3 is a diametric cross-sectional view of a mechanical braking device of the subject invention.

In FIG. 3 a mechanical braking device of the subject invention is shown. This device operates solely, for example, with spring power. The braking device is anchored to universal joint 4 in the vehicle. The belt holding the person to be protected is securely buckled and is attached to piston rod 8. If as a consequence of a sudden braking of the vehicle a pull is exerted on piston rod 8, the piston 15a compresses the spring 16. If the spring 16 is completely compressed, the piston 15a moving upward in this process slides between holding straps 17. The straps are pivotally mounted on pins 18 and are pressed outwardly at their bends by the piston 15a so far that the spring end is released from the holding straps and the spring 16 expands into the upper part of casing 19. The spreading of the holding straps 17 is limited by hooks 20 so that the lugs of the holding straps 17 still project into casing 19 and prevent a further upward movement of the piston 15a. Through the relaxation of spring 16 the energy stored up in the spring is nullified in a harmless manner and is not worked out on the person to be protected. On exceeding a load given by the spring 16 the baking device must be made ready for use again by renewed clamping of spring 16 between piston 15a and holding straps 17.

The braking devices of the subject invention when coupled with a belt or supporting harness for an automobile or airplane occupants are relatively small, of a convenient form, and can be mounted in any suitable place in the vehicle without difficulty.

In certain constructions as, for example, the shock absorber shown in FIG. 2, it is also possible to balance amounts of energy which differ greatly in their magnitude without any special adjustment being needed. Furthermore, after the dropping out of the load the piston automatically returns to its starting position, thereby the safety device immediately is again ready for use. Other constructions, for example, in a mechanical braking device shown in FIG. 3 can be reset for use with relative ease. Accordingly, the safety devices of the invention can be used practically as often as desired. With purely textile devices even after a single use a further plastic deformation is no longer possible so that no further kinetic energy can be compensated. These belts, therefore, become worthless after a single use and must be replaced by new ones. Just as in automobiles the braking device according to the invention can be used in connection with a holding belt or a holding harness in airplanes. It can likewise further be mounted on parachutes in order to take up and brake the so-called opening shock encountered in the use of a parachute.

Obviously many modifications and variations of the invention as hereinbefore set forth may be made without departing from the spirit and scope thereof, and therefore only such limitations should be imposed as are indicated in the appended claims.

The invention is hereby claimed as follows:

1. A safety device for occupants of vehicles and for parachute jumpers which comprises in combination: strap means for holding the person to be protected; braking means operatively attached to said strap means, said braking means serving to cushion the movement of said person, said braking means including a movement energy-absorbing brake cylinder, having an inner and an outer chamber, a piston rod and piston movably mounted within the inner chamber of said cylinder, said piston rod being operatively attached to said strap means, liquid brake medium filling said cylinder, means for progressively increasing the hydraulic braking force acting against the movement of said piston as said piston moves away from its position of rest, said means for progressively increasing the hydraulic braking force including successive outlet openings for said liquid brake medium in the wall separating the two chambers of said cylinder, and means for passing said liquid forced through said outlet openings by the upward movement of said piston into the area vacated by said piston, and means for slowly returning said piston to its original position of rest when the energy causing the upward thrust of said piston has been dissipated; and securing means for fastening said braking means to the body of said vehicle and parachute.

2. A safety device for occupants of vehicles and for parachute jumpers which comprises in combination: strap means for holding the person to be protected; braking means operatively attached to said strap means, said braking means serving to cushion the movement of said person, said braking means including a movement energy-absorbing brake cylinder, a piston rod and piston movably mounted within said cylinder, a helical spring surrounding said piston rod, said helical spring being compressed as said piston rod and piston are moved upwardly within said cylinder, and holding straps operatively associated with said helical spring the lugs of which straps prevent the upward movement of the upper end of said spring, said straps being so designed that they are forced apart when said piston reaches a given point in said cylinder thereby releasing the upper end of said helical spring and its stored energy, movement limiting means for said straps to prevent the piston from moving beyond the lugs of said straps; and securing means for fastening said braking means to the body of said vehicle and parachute.

References Cited

UNITED STATES PATENTS

| | | |
|---|---|---|
| 1,570,479 | 1/1926 | Goldensky et al. __ 188—88.53 X |
| 1,658,962 | 2/1928 | Aikens _____ 188—88.53 |
| 2,680,476 | 6/1954 | Saffell. |
| 2,846,029 | 8/1958 | Cawley _____ 188—94 |
| 2,880,815 | 4/1959 | Apfelbaum. |
| 3,026,972 | 3/1962 | Hendry et al. _____ 297—386 X |
| 3,089,564 | 5/1963 | Smittle. |
| 3,195,685 | 7/1965 | Blackstone. |
| 3,217,838 | 11/1965 | Peterson et al. |
| 3,232,383 | 2/1966 | Moberg. |

DAVID J. WILLIAMOWSKY, *Primary Examiner.*

JAMES T. McCALL, *Assistant Examiner.*